United States Patent
Hsieh

(10) Patent No.: US 7,729,871 B2
(45) Date of Patent: Jun. 1, 2010

(54) AIRFLOW DETECTING APPARATUS

(75) Inventor: Ming-Chih Hsieh, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/858,126

(22) Filed: Sep. 20, 2007

(65) Prior Publication Data
US 2008/0236295 A1 Oct. 2, 2008

(30) Foreign Application Priority Data
Apr. 2, 2007 (CN) .................. 2007 1 0200376

(51) Int. Cl.
*G01R 19/00* (2006.01)
*G01F 1/56* (2006.01)
*G01P 3/42* (2006.01)

(52) U.S. Cl. .................. 702/64; 73/861.08; 324/160

(58) Field of Classification Search .................. 702/64, 702/65, 189, 193, 81, 84, 127, 138, 182–183; 324/160, 177, 76.11; 165/214, 58, 59, 278; 236/1 F, 1 B, 1 C, 49.1, 91 D, 92 R, 94; 73/1.16, 73/147, 170.01, 170.11, 170.14, 195, 196, 73/202.5, 204.22–204.26, 861, 861.08, 861.42, 73/861.47, 861.77; 454/233, 236, 184, 187; 310/311, 314, 316.01, 317; 340/544, 545.2, 340/545.4, 545.6
See application file for complete search history.

(56) References Cited

U.S. PATENT DOCUMENTS 3,964,309 A * 6/1976 Husse et al. ............. 73/861.28
3,968,482 A * 7/1976 Schuman ................ 340/544
4,413,672 A * 11/1983 Sidebottom ............. 165/209

(Continued)

FOREIGN PATENT DOCUMENTS

CN 2093392 U 1/1992

OTHER PUBLICATIONS

Liu et al., Eliminating Contaminants With a Piezoelectric Transducer in the Design of Low-Cost smart Kitchen Range Hoods, Aug. 2002, IEEE Sensors Journal, vol. 2, No. 4, pp. 314-321.*

(Continued)

*Primary Examiner*—Michael P. Nghiem
*Assistant Examiner*—Toan M Le
(74) *Attorney, Agent, or Firm*—Frank R. Niranjan

(57) ABSTRACT

An airflow detecting apparatus for a fan includes an amplifier circuit (100), a comparator circuit (200), a micro control unit (MCU) (U1), and an indicating circuit (300). The amplifier circuit has an input terminal receiving a voltage signal from a piezoelectric film (H1) disposed at an airflow path of the fan, and outputs an amplified voltage signal at an output terminal. The comparator circuit has an input terminal receiving the amplified voltage signal from the amplifier circuit and compares the amplified voltage signal with a reference voltage signal received at another input terminal of the comparator circuit, and outputs a voltage level signal at an output terminal. The MCU receives the voltage level signal from the comparator circuit and processes it to output an indicating signal. The indicating circuit receives the indicating signal from the MCU and indicates status of airflow.

10 Claims, 1 Drawing Sheet

U.S. PATENT DOCUMENTS

| | | | |
|---|---|---|---|
| 4,644,474 A * | 2/1987 | Aposchanski et al. | 701/108 |
| 4,817,865 A * | 4/1989 | Wray | 236/49.3 |
| 5,039,006 A * | 8/1991 | Habegger | 236/11 |
| 5,201,322 A * | 4/1993 | Henry et al. | 600/532 |
| 5,357,810 A * | 10/1994 | Czajkowski | 73/861.28 |
| 5,963,887 A * | 10/1999 | Giorgio | 702/64 |
| 6,397,673 B1 * | 6/2002 | Kanke et al. | 73/204.11 |
| 6,856,139 B2 * | 2/2005 | Rijken et al. | 324/537 |
| 7,256,562 B2 * | 8/2007 | Lee | 318/268 |
| 2008/0198896 A1 * | 8/2008 | Nair | 374/141 |

OTHER PUBLICATIONS

Morcos, M.M., A Solid-State Speed Controller for Capacitor Motors Driving Ventilation Fans, May/Jun. 1994, IEEE Transactions on Industry Applications, vol. 30, No. 3, pp. 656-664.*

* cited by examiner

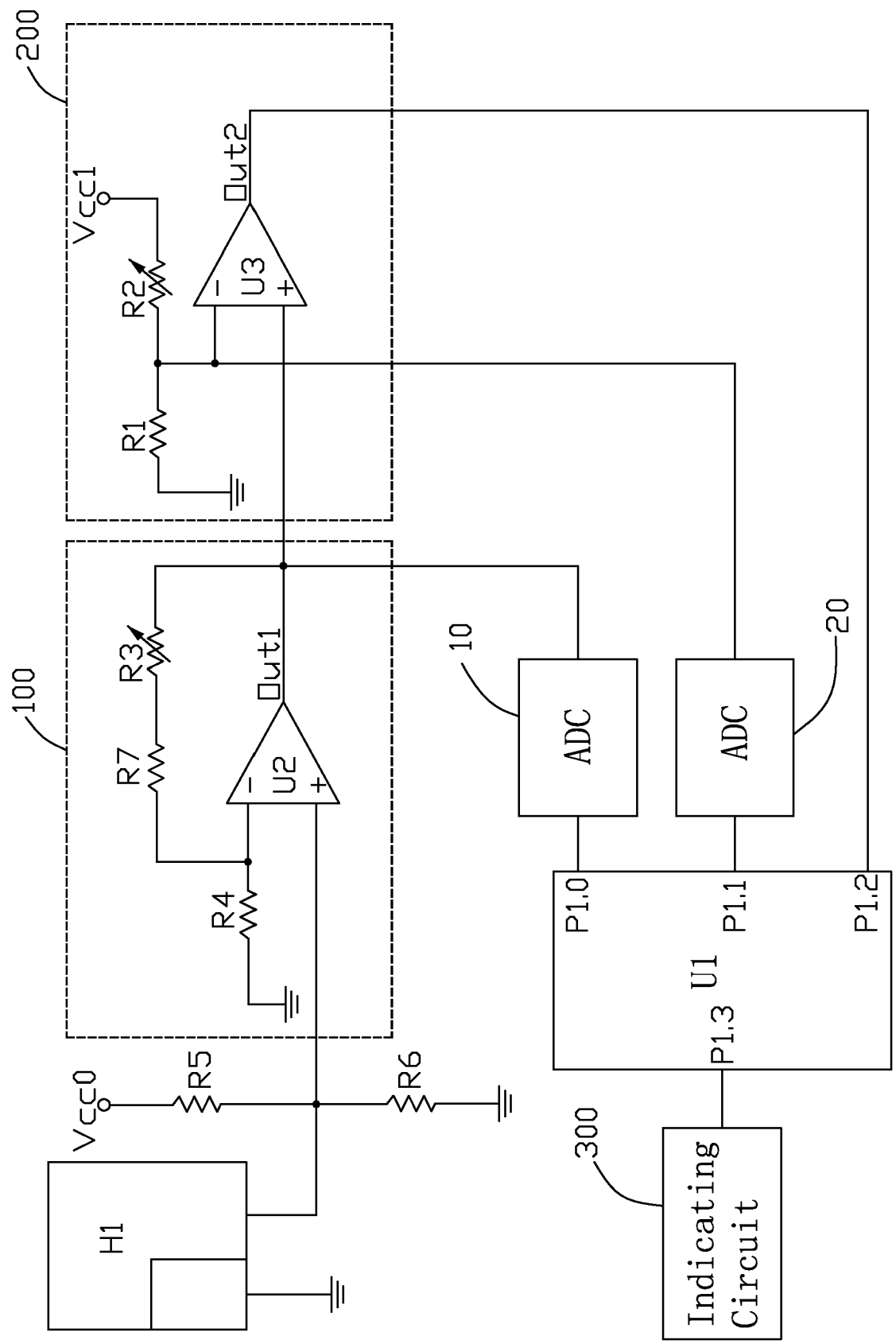

AIRFLOW DETECTING APPARATUS

BACKGROUND

1. Field of the Invention

The present invention relates to detecting apparatuses, and particularly to a detecting apparatus which can detect whether a fan in a computer room is working normally.

2. Description of Related Art

Usually, an airflow meter or an airflow switch is employed for detecting airflow from a fan. Electronic airflow meters have a high sensitivity but are expensive and inconvenient to use. Airflow switches have a relatively low price, but are less sensitive.

What is needed, therefore, is to provide a detecting apparatus with a relative low price and high sensitivity.

SUMMARY

An exemplary airflow detecting apparatus for a fan includes an amplifier circuit, a comparator circuit, a micro control unit (MCU), and an indicating circuit. The amplifier circuit has an input terminal, which receives a voltage signal from a piezoelectric film disposed at an airflow path of the fan, and outputs an amplified voltage signal at an output terminal. The comparator circuit has an input terminal, which receives the amplified voltage signal from the amplifier circuit and compares the amplified voltage signal with a reference voltage signal received at another input terminal of the comparator circuit, and outputs a voltage level signal at an output terminal. The MCU receives the voltage level signal from the comparator circuit and processes it to output an indicating signal. The indicating circuit receives the indicating signal from the MCU and indicates status of airflow.

Other objects, advantages and novel features of the present invention will become more apparent from the following detailed description of preferred embodiments when taken in conjunction with the accompanying drawings, in which:

BRIEF DESCRIPTION OF THE DRAWINGS

The drawing is a circuit diagram of one embodiment of a airflow detecting apparatus in accordance with the present invention.

DETAILED DESCRIPTION

Referring to the drawing, an airflow detecting apparatus in accordance with an embodiment of the present invention includes an amplifier circuit 100, a comparator circuit 200, a micro control unit (MCU) U1, and an indicating circuit 300.

In this embodiment, the amplifier circuit 100 includes an amplifier U2, a variable resistor R3, and two resistors R4, R7. A non-inverting input terminal of the amplifier U2 is coupled to a piezoelectric film H1, two resistors R5, R6 are connected in series between a power supply Vcc0 and ground, the non-inverting input terminal of the amplifier U2 is coupled to a node between the resistors R5, R6. An inverting input terminal of the amplifier U2 is coupled to ground via the resistor R4, and is coupled to an output terminal Out1 of the amplifier U2 via the resistor R7 and the variable resistor R3. The output terminal Out1 of the amplifier U2 is coupled to a first input terminal P1.0 pin of the MCU U1 via an Analog-to-Digital Converter (ADC) 10.

The comparator circuit 200 includes a comparator U3, a resistor R1, and a variable resistor R2. A non-inverting input terminal of the comparator U3 is coupled to the output terminal Out1 of the amplifier U2. An inverting input terminal of the comparator U3 is coupled to ground via the resistor R1, coupled to a power supply Vcc1 via the variable resistor R2, and a second input terminal P1.1 pin of the MCU U1 via an ADC 20. An output terminal Out2 of the comparator U3 is coupled to a third input terminal P1.2 pin of the MCU U1. An output terminal P1.3 pin of the MCU U1 is coupled to the indicating circuit 300. In this embodiment, the MCU U1 is a Single Chip Microcomputer (SCM), the pins P1.0~P1.3 are I/O pins of the SCM.

When a fan for dissipating heat rotates, airflow from the fan blows against the piezoelectric film H1 and the piezoelectric film H1 generates a weak voltage signal. The weak voltage signal is amplified by the amplifier circuit 100 and then transmitted to the comparator circuit 200. The comparator circuit 200 compares the amplified voltage signal with a reference voltage signal at the inverting input terminal of the comparator U3, and outputs a high voltage level signal at the output terminal Out2 of the comparator U3. The MCU U1 receives the high voltage level signal from the comparator circuit 200 and processes it to output an indicating signal. The indicating circuit 300 receives the indicating signal from the MCU U1 and outputs a first signal to indicate that the fan is producing airflow.

If the fan stops rotating, the output terminal Out1 of the amplifier U2 does not output a voltage signal, the comparator U3 outputs a low voltage level signal at the output terminal Out2. The MCU U1 receives the low voltage level signal from the comparator U3 and processes it to output an indicating signal. The indicating circuit 300 receives the indicating signal from the MCU U1 and outputs a second signal to indicate that the fan is not producing airflow.

In this embodiment, adjusting resistance of the variable resistor R3 can change the gain of the amplifier U2, and the variable resistor R2 can be adjusted to change the value of the reference voltage, to adjust for strength of the airflow from the fan, ensuring that the indicating circuit is properly driven. The MCU U1 receives data of the airflow signal and the reference voltage signal respectively via the ADCs 10 and 20.

The foregoing description of the exemplary embodiment of the invention has been presented only for the purposes of illustration and description and is not intended to be exhaustive or to limit the invention to the precise forms disclosed. Many modifications and variations are possible in light of the above teaching. The embodiment was chosen and described in order to explain the principles of the invention and its practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiment described therein.

What is claimed is:

1. An airflow detecting apparatus for a fan, comprising:
    an amplifier circuit with an input terminal receiving a voltage signal from a piezoelectric film which is disposed at a path of airflow from the fan, and outputting an amplified voltage signal;
    a comparator circuit with an input terminal receiving the amplified voltage signal from the amplifier circuit and comparing the amplified voltage signal with a reference voltage signal received at another input terminal of the comparator circuit, and outputting a voltage level signal;

a micro control unit (MCU) configured for receiving the voltage level signal from the comparator circuit and processing it to output an indicating signal; and an indicating circuit configured for receiving the indicating signal from the MCU and indicating status of the fan according to status of airflow of the wherein the amplifier circuit comprises an amplifier, a non-inverting input terminal of the amplifier acting as the input terminal of the amplifier circuit is coupled to the piezoelectric film, an inverting input terminal of the amplifier is coupled to ground via a first resistor, the inverting input terminal of the amplifier is coupled to an output terminal of the amplifier via a first variable resistor.

2. The airflow detecting apparatus as claimed in claim 1, further comprising a second resistor and a third resistor connected in series between a power supply and ground, wherein one node between the second resistor and the third resistor is connected to the piezoelectric film and the input terminal of the amplifier circuit such that the voltage signal from the piezoelectric film is transmitted to the input terminal of the amplifier circuit via the node.

3. The airflow detecting apparatus as claimed in claim 1, wherein the amplifier circuit further comprises a fourth resistor connected in series with the first variable resistor between the output terminal and the input terminal of the amplifier an amplifier.

4. The airflow detecting apparatus as claimed in claim 1, wherein the comparator circuit comprises a comparator, a fifth resistor, and a second variable resistor, a non-inverting input terminal of the comparator acting as the input terminal of the comparator circuit is coupled to the output terminal of the amplifier, an inverting input terminal of the comparator acting as the another input terminal of the comparator circuit is coupled to ground via the fifth resistor, the inverting input terminal of the comparator is coupled to another power supply via the second variable resistor.

5. The airflow detecting apparatus as claimed in claim 4, further comprising two Analog-to-Digital Converters (ADCs), wherein the output terminal of the amplifier circuit and the inverting input terminal of the comparator are respectively coupled to the MCU via the corresponding ADC.

6. An airflow detecting apparatus for detecting status of airflow of a fan, comprising:
    a piezoelectric film disposed at a path of airflow of the fan configured to generate a voltage signal when the fan works properly;
    an amplifier circuit having an input terminal connected to the piezoelectric film for receiving the voltage signal, and an output terminal for outputting an amplified voltage signal, wherein the amplifier circuit comprises an amplifier with an adjustable gain;
    a comparator circuit comprising a comparator, the comparator comprising a non-inverting input terminal configured to receive the amplified voltage signal from the amplifier circuit, and an inverting input terminal coupled to ground via a resistor and coupled to a power supply via a variable resistor, the comparator is configured to compare the amplified voltage signal with an adjustable reference voltage signal and output a voltage level signal based on the comparing result;
    a micro control unit (MCU) configured to receive the voltage level signal from the comparator circuit and process it to output an indicating signal; and
    an indicating circuit configured to receive the indicating signal from the MCU and indicating status of the fan according to status of airflow of the fan.

7. The airflow detecting apparatus as claimed in claim 6, wherein the amplifier comprises a non-inverting input terminal acting as the input terminal of the amplifier circuit and coupled to the piezoelectric film, an inverting input terminal coupled to ground via a resistor, and an output terminal coupled to the inverting input terminal via a variable resistor.

8. The airflow detecting apparatus as claimed in claim 7, further comprising a pair of resistors connected in series between a power supply and ground, wherein one node between said pair of resistors is connected to the piezoelectric film and the non-inverting input terminal of the amplifier circuit such that the voltage signal from the piezoelectric film is transmitted to the non-inverting input terminal of the amplifier circuit via the node.

9. The airflow detecting apparatus as claimed in claim 7, further comprising two Analog-to-Digital Converters (ADCs), wherein the output terminal of the amplifier circuit and the inverting input terminal of the comparator are respectively coupled to the MCU via the corresponding ADCs.

10. An airflow detecting apparatus for a fan, comprising:
    a piezoelectric film disposed at a path of airflow of the fan configured to generate a voltage signal when the fan works properly;
    an amplifier circuit receiving the voltage signal, and outputting an amplified voltage signal;
    a pair of resistors connected in series between a power supply and ground, one node between said pair of resistors is connected to the piezoelectric film and the amplifier circuit such that the voltage signal from the piezoelectric film is transmitted to the amplifier circuit via the node;
    a comparator circuit receiving the amplified voltage signal from the amplifier circuit, and comparing the amplified voltage signal with a reference voltage signal and outputting a voltage level signal based on the comparing result;
    a micro control unit (MCU) configured to receive the voltage level signal from the comparator circuit and process it to output an indicating signal; and
    an indicating circuit configured to receive the indicating signal from the MCU and indicate status of the fan according to status of airflow of the fan.

* * * * *